Oct. 16, 1923.                                  1,470,917
H. C. GOSS
BATTERY CABINET
Filed June 6, 1922            2 Sheets-Sheet 1

Inventor
H. C. Goss

Oct. 16, 1923.
H. C. GOSS
BATTERY CABINET
Filed June 6, 1922   2 Sheets-Sheet 2
1,470,917
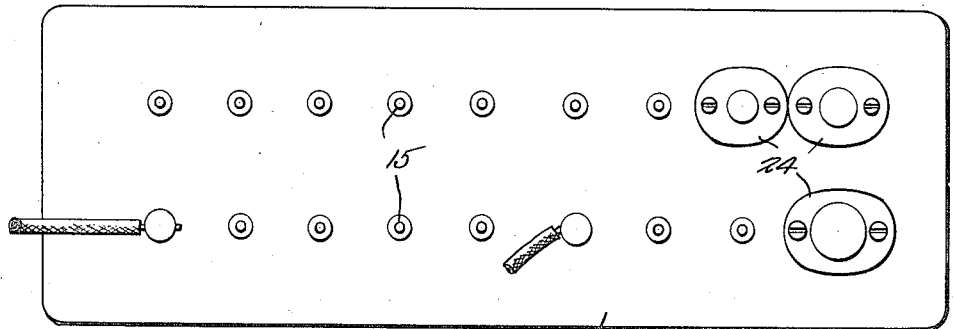
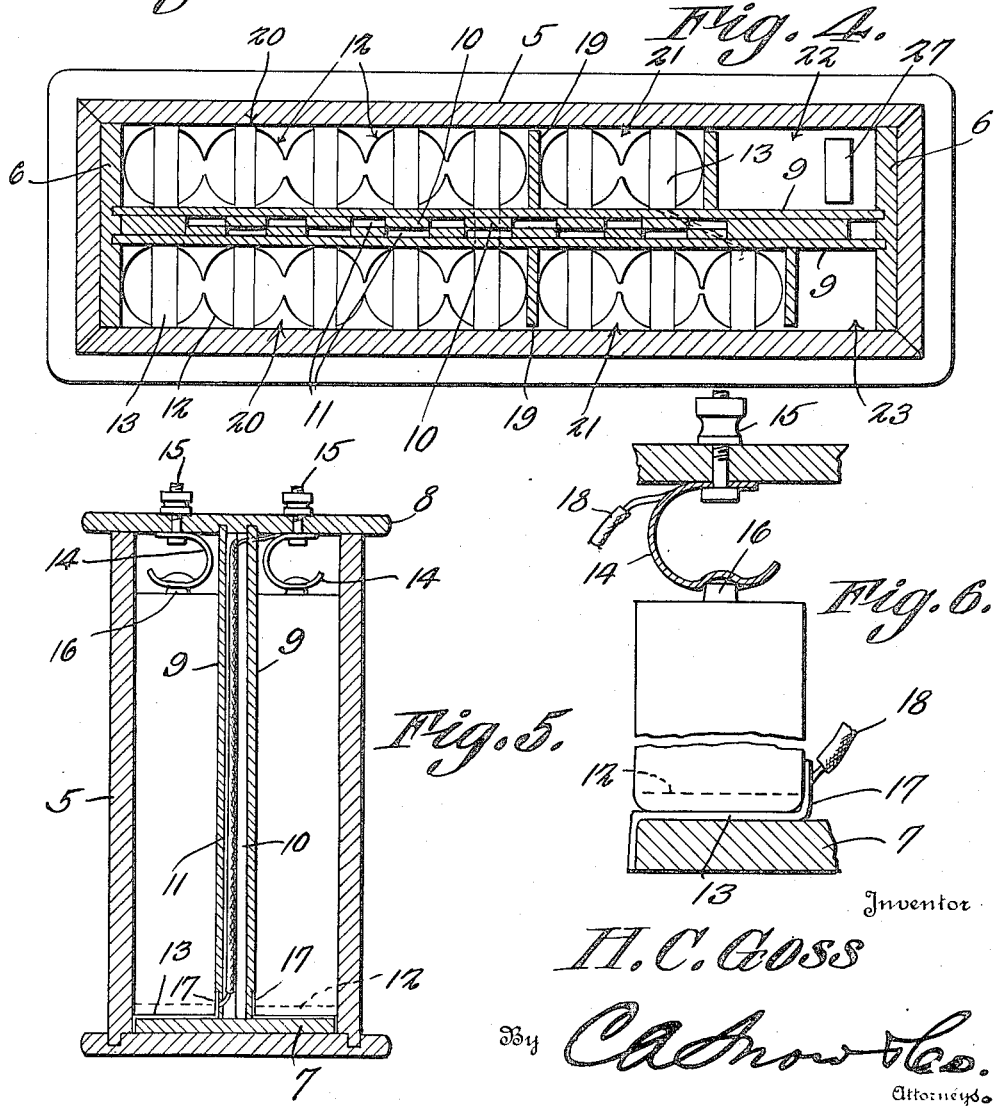

Patented Oct. 16, 1923.

1,470,917

UNITED STATES PATENT OFFICE.

HERBERT C. GOSS, OF BEACH HAVEN, PENNSYLVANIA.

BATTERY CABINET.

Application filed June 6, 1922. Serial No. 566,324.

*To all whom it may concern:*

Be it known that I, HERBERT C. GOSS, a citizen of the United States, residing at Beach Haven, in the county of Luzerne and State of Pennsylvania, have invented a new and useful Battery Cabinet, of which the following is a specification.

This invention relates to battery construction, and aims to provide a novel form of cabinet wherein the usual dry cells may be employed in the construction of a B-battery, employed in radio apparatus.

The primary object of the invention is to provide a device of this character wherein the cells may be readily removed and replaced when the same become dead, eliminating the necessity of discarding the entire battery, when one or more cells are rendered inoperative.

A still further object of the invention is to provide a cabinet of this character supplied with means whereby the cells may be tested, to determine the condition of the same.

With the foregoing and other objects in view which will appear as the description proceeds, the invention resides in the combination and arrangement of parts and in the details of construction hereinafter described and claimed, it being understood and claimed that changes in the precise embodiment of the invention herein disclosed, may be made within the scope of what is claimed, without departing from the spirit of the invention.

Referring to the drawings:—

Figure 3 is a plan view of the cabinet.

Figure 4 is a sectional view taken on line 4—4 of Figure 1.

Figure 5 is a sectional view taken on line 5—5 of Figure 1.

Figure 6 is an enlarged detail view disclosing one of the elements of a cell as supported within a tester.

Figure 1:
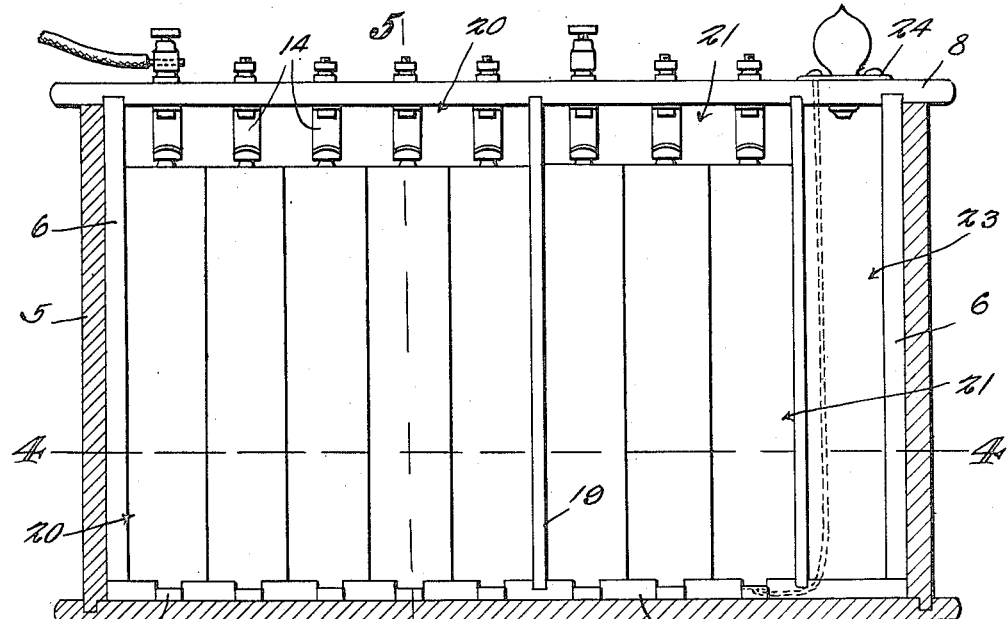
Figure 1 is a sectional view through the cabinet disclosing the inner member of the cabinet in elevation.
Figure 2:
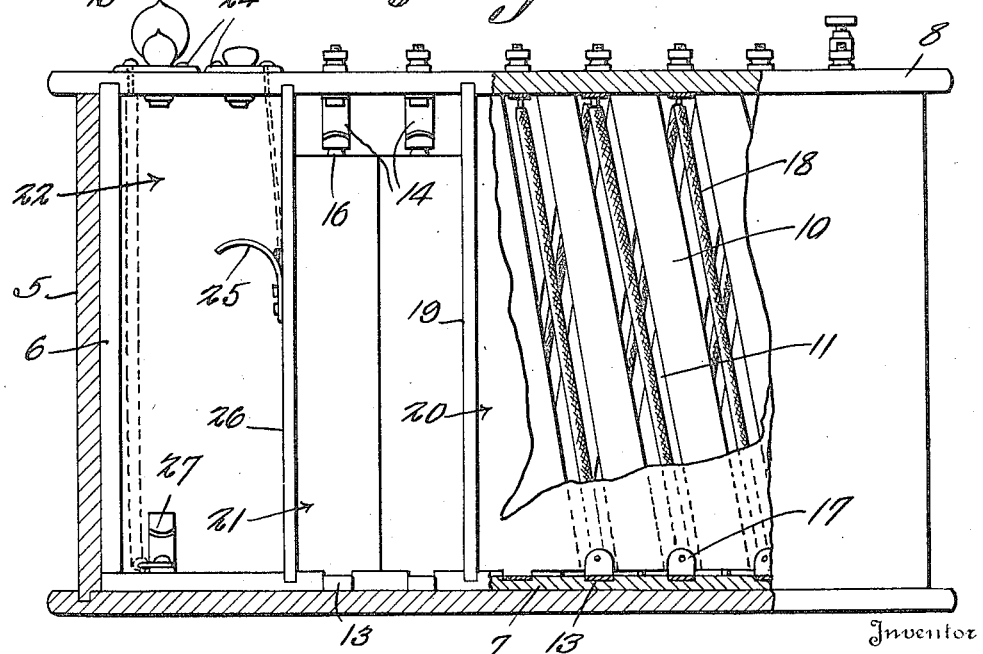
Figure 2 is a sectional view through the cabinet and disclosing the opposite side thereof.

Referring to the drawings in detail, the reference character 5 indicates the outer casing of the cabinet, in which the inner section is positioned, the inner section including end bars 6, a bottom bar 7 and an upper bar 8, the upper bar being relatively long and extending over the end bars of the outer casing 5 to provide a closure for the casing.

The end bars 6 of the inner casing are formed with spaced grooves to accommodate the partitioning boards 99 that are held in spaced relation by means of the blocks 10, the blocks being also arranged in spaced relation with each other to provide compartments 11 to receive the wires employed for connecting the various cells forming the battery.

The bottom bar 7 is formed with a plurality of circular openings 12 which openings are of diameters to accommodate the lower ends of battery cells and secure the same against movement, suitable contact plates 13 being provided in the openings 12 constituting means for connecting the wire of the adjacent battery cell thereto, so that the cells, when arranged within the cabinet are in series.

Secured to the under surface of the upper bar 8 are spring contact arms 14 which have connection with the binding posts 15 so that electric energy from the cells contacting with the spring arms may be carried off. Each of the spring arms 14 is formed with a depressed portion to receive the lug 16 forming one of the contact members of the cells, whereupon the cells when positioned under the spring arms will beheld against movement.

These binding posts are arranged in spaced relation with each other, and are disposed directly over the cell compartments so that electric energy from one or more cells may be taken off to increase or decrease the voltage to the apparatus associated with the battery.

The contact plates 13 are formed with upwardly extended ears 17 providing means for securing the lower ends of the wires 18 to the plates, the upper ends thereof having connection with the adjacent binding post 15 as clearly shown by Figure 5 of the drawings.

Partitioning members 19 have connection with the partitioning members 9 and divide the inner section of the battery proper into compartments 20 and 21, the compartment 20 constituting an amplifier section while the compartment 21 constitutes the detector section, thereby embodying an amplifier and detector in a single housing. Compartments 22 and 23 are formed at one end of the battery housing, which compartments receive cells when it is desired to test the voltage of the same. Lamp sockets 24 are provided in the upper bar 8, directly over the compartments 22 and 23, the lamp sockets being designed to accommodate various sized lamps, whereby one or more battery cells, or elements forming the same may be tested, it being understood that suitable contact means is provided in the compartments for completing a circuit through the battery cell being tested, to the lamps.

A spring arm indicated at 25 is secured to the partitioning member 26, the same being disposed in such relation with the lamp socket 24 positioned thereabove that one of the elements of a cell may be positioned therebetween, to test the voltage of the same.

Positioned at the base of the compartment 22 is a contact arm 27 designed to contact with the base of a battery cell to force the upper extremity thereof into engagement with the lamp placed in the lamp socket disposed in the upper wall or bar 8.

From the foregoing it will be seen that I have provided a B-battery and cabinet embodying a removable inner section constructed to receive the usual battery cells in such a way that the cells may be readily removed and replaced, thereby eliminating the necessity of discarding the entire battery, when one or more of the cells is rendered inoperative.

Having thus described the invention, what is claimed as new is:—

In a battery cabinet, an outer section and a removable inner section, partitioning members disposed within the inner section, blocks for holding the partitions in spaced relation with each other, said blocks being disposed in staggered relation with each other to provide compartments, the space between the partitions and walls of the inner section, accommodating battery members, conducting wires disposed in the compartments formed by the block, and contact members forming a part of the cabinet and contacting with the batteries.

In testimony that I claim the foregoing as my own, I have hereto affixed my signature.

HERBERT C. GOSS.